United States Patent
Peacock

(10) Patent No.: US 7,944,118 B2
(45) Date of Patent: May 17, 2011

(54) SYSTEM AND METHODOLOGY FOR GENERATING ELECTRICITY USING AT LEAST ONE HEAT ENGINE AND THERMOACOUSTIC ELEMENT TO APPLY CYCLIC PRESSURE GRADIENTS TO PIEZOELECTRIC MATERIAL

(76) Inventor: Kimberly Peacock, Fresh Meadows, NY (US)

( * ) Notice: Subject to any disclaimer, the term of this patent is extended or adjusted under 35 U.S.C. 154(b) by 486 days.

(21) Appl. No.: 11/867,038

(22) Filed: Oct. 4, 2007

(65) Prior Publication Data

US 2008/0067893 A1 Mar. 20, 2008

Related U.S. Application Data

(63) Continuation-in-part of application No. 11/530,147, filed on Sep. 8, 2006, now Pat. No. 7,439,630.

(51) Int. Cl.
*H02N 2/18* (2006.01)

(52) U.S. Cl. ........ 310/322; 310/339; 310/341; 381/173; 290/1 R; 290/1 A; 290/2

(58) Field of Classification Search .............. 310/322, 310/339, 341; 290/1 A, 1 R, 2
See application file for complete search history.

(56) References Cited

U.S. PATENT DOCUMENTS

| | | | |
|---|---|---|---|
| 633,829 | A | 9/1899 | Gallegos |
| 1,974,483 | A | 9/1934 | Brown |
| RE30,840 | E | 1/1982 | Terry |
| 4,467,236 | A * | 8/1984 | Kolm et al. ............ 310/321 |
| 4,754,805 | A | 7/1988 | Rothmeyer |
| 4,781,029 | A * | 11/1988 | SerVaas ................ 60/641.7 |
| 4,928,496 | A | 5/1990 | Wallace et al. |
| 4,943,750 | A | 7/1990 | Howe et al. |
| 5,046,319 | A | 9/1991 | Jones |
| 5,165,243 | A | 11/1992 | Bennett |
| 5,497,630 | A | 3/1996 | Stein et al. |
| 5,647,216 | A | 7/1997 | Garrett |
| 5,705,902 | A | 1/1998 | Merritt et al. |
| 5,813,234 | A | 9/1998 | Wighard |
| 6,314,740 | B1 * | 11/2001 | De Blok et al. ............ 62/6 |
| 6,353,276 | B1 | 3/2002 | Gendron |
| 6,396,186 | B1 | 5/2002 | Post |
| 6,425,440 | B1 | 7/2002 | Tsenter et al. |
| 6,899,967 | B2 | 5/2005 | Johnson |

(Continued)

OTHER PUBLICATIONS

"Integrated Cabin and Fuel Cell System Thermal Management with a Metal Hydride Heat Pump", V. Hovland, Conference Paper, National Renewable Energy Laboratory, Report No. NREL/CP-540-36735, Dec. 2004.

(Continued)

*Primary Examiner* — Walter Benson
*Assistant Examiner* — Bryan P Gordon
(74) *Attorney, Agent, or Firm* — Gordon & Jacobson, PC

(57) ABSTRACT

A system for generating electrical power supply signals includes at least one heat engine that undergoes heating/cooling cycles and corresponding temperature variations. A thermoacoustic element is thermally coupled to the chamber. The temperature variations of the heat engine induce thermoacoustic oscillations of the thermoacoustic element which form a pressure wave. At least one piezoelectric transducer is deformed by the pressure wave. A power converter can be used to transform the electric signals generated in response to deformation of the at least one piezoelectric transducer to a desired electrical power supply signal. The heat engine preferably uses a geothermal source of cold and an ambient source of hot (typically used in the summer months), or vice-versa (typically used in the winter months).

22 Claims, 5 Drawing Sheets

U.S. PATENT DOCUMENTS

| | | | |
|---|---|---|---|
| 2002/0017380 A1 | 2/2002 | Jonsson et al. | |
| 2002/0166325 A1* | 11/2002 | Corey | 62/6 |
| 2004/0181154 A1* | 9/2004 | Peterson et al. | 600/459 |
| 2004/0231341 A1* | 11/2004 | Smith | 62/6 |
| 2005/0067005 A1* | 3/2005 | Van Der Spek | 136/205 |
| 2005/0082949 A1 | 4/2005 | Tsujiura | |
| 2005/0274123 A1* | 12/2005 | Smith et al. | 62/6 |
| 2006/0119224 A1* | 6/2006 | Keolian et al. | 310/339 |

OTHER PUBLICATIONS

"Power Generation from Piezoelectric Lead Zirconate Titanate Fiber Composites", F. Mohammadi et al., Mat. Res. Soc. Symp. Proc. vol. 736 © 2003 Materials Research Society.

"The Electromechanical Battery: The New Kid on the Block" Richard F. Post, Aug. 1993.

"A Micro Corona Motor", Sanghoon Lee et al., Science Direct, available at www.sciencedirect.com, Sep. 29, 2003.

"Marx Generators" Jim Lux, High Voltage Experimenter's Handbook, May 3, 1998.

A New Look at an Old Idea—The Electromechanical Battery, Science and Technology Review, Apr. 1996.

"Residential Piezoelectric Energy Sources", Andrew Katz, Delta Smart House, Jul. 21, 2004.

Generation and Storage of Electricity from Power Harvesting Devices, Henry A. Sodano et al., Journal of Intelligent Material Systems and Structures, vol. 16, No. 1, 67-75 (2005) DOI: 10.1177/1045389X05047210; 2005 SAGE Publications.

"Thermoacoustic Engines and Refrigerators" Resource Letter: TA-1, Steven L. Garrett, Am. J. Phys vol. 72 No. 1, Jan. 2004.

Metal Hydride Temperature Ampifiers for High Temperature (>260°) Applications—A Parametric Study, M.R. Ally, Oak Ridge National Laboratory, Dec. 1986.

"Parasitic Power Harvesting in Shoes", John Kymissis, et al., Draft 2.0, Aug. 1998; Presented at the Second IEEE International Conference on Wearable Computing.

"Electromagnetic Generators for Portable Power Appliations" Matthew Kurt Senesky, Dissertation, University of California, Berekley, Jun. 2005.

Design and Construction of a Thermoacoustic Device, Owen Lucas and Karel Meeuwissen, Sep. 14, 2001.

* cited by examiner

SYSTEM AND METHODOLOGY FOR GENERATING ELECTRICITY USING AT LEAST ONE HEAT ENGINE AND THERMOACOUSTIC ELEMENT TO APPLY CYCLIC PRESSURE GRADIENTS TO PIEZOELECTRIC MATERIAL

CROSS-REFERENCE TO RELATED APPLICATIONS

This is a continuation-in-part of U.S. patent application Ser. No. 11/530,147, entitled "SYSTEM AND METHODOLOGY FOR GENERATING ELECTRICITY USING A CHEMICAL HEAT ENGINE AND PIEZOELECTRIC MATERIAL," filed on Sep. 8, 2006 now U.S. Pat. No. 7,439,630, herein incorporated by reference in its entirety.

BACKGROUND OF THE INVENTION

1. Field of the Invention

This invention relates broadly to mechanisms for generating electricity. More particularly, this invention relates to mechanisms for generating electricity using piezoelectric materials.

2. State of the Art

Piezoelectricity is the result of charge displacement within a crystalline structure which lacks a central symmetry. Piezoelectric elements when subjected to a mechanical load (e.g., vibration, compression, and/or flexing) induce an electrical charge on opposite faces of a piezoelectric material. In the prior art, piezoelectric elements have been used for actuators, transducers, resonators, transformers, micro generators, and sensors of all types. Recently piezoelectric elements have been researched and developed for energy scavenging. The piezoelectric element functions as a capacitor in response to stress or strain.

When a piezoelectric material is subjected to a compressive or tensile stress, an electric field is generated across the material, creating a voltage gradient and a subsequent current flow due to compressive or tensile stress which seeks equilibrium. The current flow is provided by a conductive material that allows the unequal charge of the piezoelectric material to equalize by moving the unequal charge off from the piezoelectric material. Piezoelectric materials generate high voltage and low current electricity. The piezoelectric effect is reversible in that piezoelectric material, when subjected to an externally applied voltage, can change shape. Direct piezoelectricity of some substances (e.g., quartz, Rochelle salt) can generate voltage potentials of thousands of volts.

Piezoelectric materials store energy in two forms, as an electrical field, and as a mechanical displacement (strain). The relationship between strain and the electric field is given by $SC=1/ST(SR-(d*e))$ where "SC" is the compliance of the piezoelectric element in a constant electric field, "SR" is the mechanical deformation and "d" is the piezoelectric charge constant. The charge produced when a pressure is applied is: $Q=d*P*A$, where P is the pressure applied and A is the area on which the pressure is applied. Utilizing multiple piezoelectric stacks on top of one another and connecting them in parallel increases the charge in relationship to pressure. The output voltage generated can be expressed as the total charge of the stack divided by the capacitance of the stack.

In the prior art, piezoelectric materials have been used to scavenge energy from vibration energy induced by wind, ocean waves, ambient sound, automobile traffic, the deformation of an automobile tire, and the foot strike of a human being on a floor. However, the prior art methodologies have resulted in very low power output, which makes such solutions suitable only for low power applications.

Thus, there remains a need in the art for systems and methodologies that generate electricity by applying pressure gradients to piezoelectric material in manner that is suitable for a wide range of power supply applications, such as residential or commercial power supply applications.

SUMMARY OF THE INVENTION

It is therefore an object of the invention to provide systems and corresponding methodologies that apply cyclic pressure gradients to piezoelectric material to generate corresponding electrical signals that can be used to generate electrical power suitable for a wide range of power supply applications, such as residential or commercial power supply applications.

It is another object of the invention to provide such systems and methodologies that utilize a heat engine in combination with a thermoacoustical element to generate the cyclic pressure gradients that are applied to the piezoelectric material.

It is a further object of the invention to provide such systems and methodologies that utilize environmentally friendly, low-cost geothermal and ambient sources of hot and cold to power the heat engine.

It is also an object of the invention to provide efficient conversion of the electrical energy output by the piezoelectric material.

In accord with these objects, which will be discussed in detail below, a system (and corresponding methodology) for generating electrical signals includes at least one heat engine that undergoes a cycle of heating and cooling and corresponding temperature variations. A thermoacoustic element is thermally coupled to the heat engine. The temperature variations of the heat engine induce thermoacoustic oscillations of the thermoacoustic element which form a pressure wave. At least one piezoelectric transducer is deformed by the pressure wave. A power converter can be used to transform the electric signals generated in response to deformation of the at least one piezoelectric transducer to a desired electrical power supply signal. The heat engine preferably uses a geothermal source of cold and an ambient source of hot (typically used in the summer months), or vice-versa (typically used in the winter months).

It will be appreciated that the heat engine can readily be adapted to undergo temperature variations which induce the generation of pressure waves by the thermoacoustical element. Such pressure waves and produce stresses and corresponding deformations of the piezoelectric transducer. Such deformations cause high voltage, low current pulses that are transformed by the power converter.

In the preferred embodiment, the thermoacoustic element generates a standing pressure wave within a resonant cavity. The piezoelectric transducer in located within the resonant cavity. Two thermoacoustic elements can be disposed on opposite sides of the resonant cavity. Two heat engines can be thermally coupled to the thermoacoustic elements in order to induce the generation of a standing pressure wave in the resonant cavity therebetween.

In an illustrative embodiment, the heat engine uses hydrogen as a working fluid as well as metal hydride material for absorbing and desorbing hydrogen during the cycle of heating and cooling of the heat engine. A phase change material can also be used.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1A:
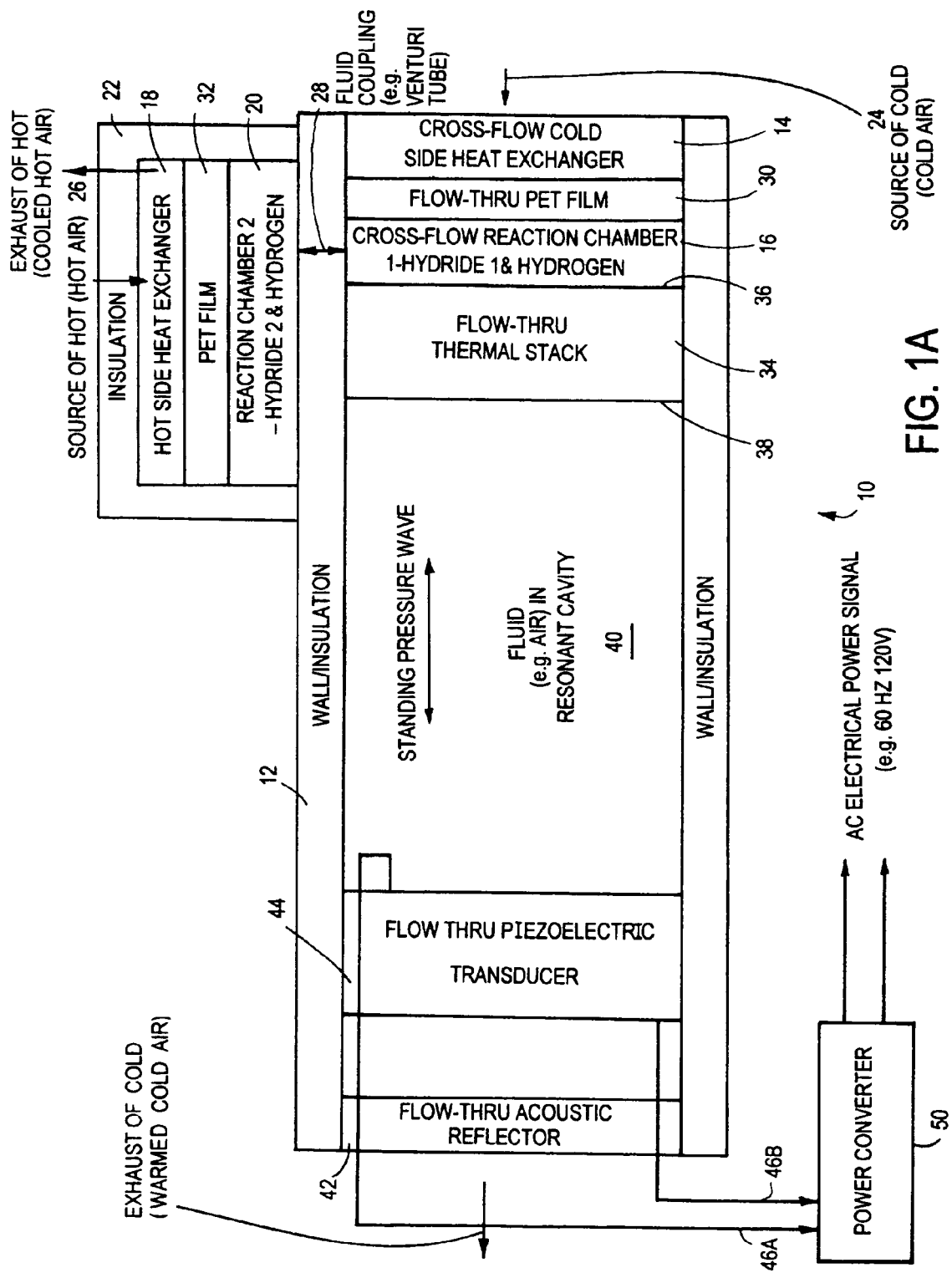
FIG. 1A is a block diagram of a power generator system in accordance with a first exemplary embodiment of the present invention.

Turning now to FIG. 1A, there is shown a pictorial illustration of an electrical energy generator system 10 in accordance with the present invention. The system 10 includes a tubular housing 12 preferably with an exterior thermal insulating liner, which can be realized with a space filled with an aerogel or other suitable thermal insulating material. The housing 12 defines an interior space in which is supported a cold-side heat exchanger 14 in thermal contact with a first reaction chamber 16. A hot-side heat exchanger 18 in thermal contact with a second reaction chamber 20 is supported on the exterior of the housing 12. An exterior thermal insulating liner 22, which can be realized with a space filled with an aerogel or other suitable thermal insulating material, preferably surrounds the hot-side heat exchanger 18 and second reaction chamber 20 in order to insulate these components.

A supply of cold (e.g., cold air) 24 is supplied to the cold-side heat exchanger 14, and a supply of hot (e.g., hot air) 26 is supplied to the hot-side heat exchanger 18. The first and second reaction chambers 16, 20 are fluidly coupled to one another by a fluid coupling mechanism 28 such as a venturi tube or the like. The first and second reaction chambers 16, 20 include metal hydride material and preferably phase change material that operate in conjunction with hydrogen working fluid therein as a chemical heat engine that is powered by the temperature difference between the cold-side heat exchanger 14 (dictated by the source of cold 24) and the hot-side heat exchanger 18 (dictated by the source of hot 26).

The first reaction chamber 16 contains at least one metal hydride material capable of hydrogen absorption and desorption and preferably at least one phase change material in thermal contact with the hydrogen working fluid. Similarly, the second reaction chamber 20 contains at least one metal hydride material capable of hydrogen absorption and desorption and preferably at least one phase change material in thermal contact with the hydrogen working fluid. The metal hydride material(s) of the reaction chambers 16, 20 are selected such that the metal hydride material(s) of the first reaction chamber 16 is(are) absorbing hydrogen (releasing heat) while the metal hydride material(s) of the second reaction chamber 20 is(are) desorbing hydrogen (absorbing heat), and vice-versa, over the expected temperature differentials between the cold-side heat exchanger 14 and the hot-side heat exchanger 18. In this manner, the heat generation and heat absorption operations of the reaction chambers 16 and 20 are at or near 180 degrees out of phase with respect to one another in order to minimize the cycle time (maximize the frequency) of the chemical heat engine.

During the cyclical operations of the heat engine, heat flows from the hot-side heat exchanger 18 to the second reaction chamber 20 and heat flows from the first reaction chamber 16 to the cold-side heat exchanger 14. A film 30 of metallized biaxially-oriented polyethylene terephthalate (PET) or the like can be disposed between the cold-side heat exchanger 14 and the first reaction chamber 16 to minimize unwanted heat flow from the cold-side heat exchanger 14 to the first reaction chamber 16. Similarly, a film 32 of metallized biaxially-oriented polyethylene terephthalate (PET) or the like can be disposed between the hot-side heat exchanger 18 and the second reaction chamber 20 to minimize unwanted heat flow from the second reaction chamber 20 to the hot-side heat exchanger 18.

A thermal stack 34 is disposed in the interior space of the housing 12. The thermal stack 34 is preferably realized by a series of thin parallel fins, an interconnected grid of thin rod-like members made of a thermally conductive material (such as copper, cooper alloys, stainless steel, pyrolytic graphite). The thermal stack 34 can also be realized from a honeycomb-like thin walled ceramic structure, such as Celcore® sold commerically by Corning Environmental Technologies of Corning, N.Y. The thermal stack 34 has one side 36 opposite side 38. The side 36 is in thermal contact with the first reaction chamber 16. The cyclical temperature variation of the reaction chamber 16 during the heating and cooling cycles of the heat engine are experienced at the side 36 of the thermal stack 30. Such cyclical temperature variations cause thermoacoustic oscillations of the thermal stack 34. A resonant cavity 40 is defined within the housing 12 adjacent side 38 of the thermal stack 34. The thermal stack 34 and resonant cavity 40 are designed such that the thermoacoustic oscillations of the thermal stack 34 form a standing pressure wave within the resonant cavity 40. The standing pressure wave will have a frequency at or near the operating frequency of the heat engine. In the preferred embodiment, the effective length of the resonant cavity 40 is proportional to ½ the wavelength of the standing pressure wave. The housing 12 can be adapted such that the interior surface of the resonant cavity 40 is acoustically reflective and thus minimizes any acoustic losses therein. An acoustic reflecting element 42 is disposed at the end of the resonant cavity 40 opposite the thermal stack 34.

At least one piezoelectric transducer 44 is disposed within the resonant cavity 40. The piezoelectric transducer 44 is realized from a piezoelectric material such as quartz, Rochelle salt, barium titanate, zinc oxide, lead titanate, lead zirconate titanate, lead lanthanum zirconate titanate, lead magnesium niobate, potassium niobate, potassium sodium niobate, potassium tantalate niobate, lead niobate, lithium niobate, lithium tantalate, fluoride poly(vinylidene flouride or other suitable material. In the preferred embodiment, the piezoelectric transducer 44 is realized as an interconnected grid of thin rod-like piezoelectric members. The standing pressure wave that is generated in the resonant cavity 40 induces cyclical mechanical stresses on the piezoelectric transducer 44. At least one pair of electrodes 46A, 46B are electrically coupled to the piezoelectric transducer 44. The electrodes 46A, 46B output electrical signals generated by the piezoelectric transducer 44 as a result of the cyclical mechanical stress induced therein by the standing pressure wave generated in the resonant cavity 40.

In the illustrative embodiment shown, the source of cold 24 (e.g., cold air) is injected or drawn into one end of the tubular housing 12 and flows through the interior space of the tubular housing 12 where it warmed by the operation of the heat engine and ejected or pulled from the opposite end of the tubular housing 12. In this configuration, the components of the system disposed within the interior space of the housing 12 (the cold-side heat exchanger 14, film 30, first reaction chamber 16, thermal stack 34, piezoelectric transducer 44 and acoustic reflector 42) allow for flow-thru of such cold fluid.

In alternate embodiments not shown, the source of cold 24 can be supplied to the cold-side heat exchanger 14 by a fluid coupler or the like. When such a fluid coupler is used, the components of the system disposed within the interior space of the housing 12 (the cold-side heat exchanger 14, film 30, first reaction chamber 16, thermal stack 34, piezoelectric transducer 44 and acoustic reflector 42) need not allow for flow-thru of such cold fluid.

The metal hydride material(s) of the first and second reaction chambers 16, 20 can be held in one or more beds or other storage container(s). Such metal hydride material(s) may comprise:
  i) lithium nitride;
  ii) magnesium hydride;
  iii) lanthium nickel hydride (LaNi5H6), or modifications of lanthium nickel hydride by some substitution of either the La or Ni;
  iv) vanadium-based solid solution which have the general formula (V1-xTix)1-y My, where M is usually a Group VI to VIII metal such as Fe, Ni, Cr, or Mn; and/or v) Laves phase hydrides which have the general formula, AB2, where A is usually a rare earth, Group III or Group IV metal and B is usually a Group VIII metal, but may also be a metal from Groups V, VI or VII.

The phase change material(s) of the first and second reaction chambers 16, 20 can be zeolite, eutectic alloys, paraffins, organic compounds, salt hydrates, carbonates, nitrates, polyhydric alcohols and metals.

As described above, a supply of cold 24 is supplied to the cold-side heat exchanger 16. A supply of hot 26 is supplied to the hot-side heat exchanger 18. The supply of cold 24 preferably includes a circulator (e.g., pump, fan) for providing a continuous supply of cold fluid to the cold-side heat exchanger 16 over multiple heating/cooling cycles of the chemical heat engine. The supply of hot 26 preferably includes a circulator (e.g., pump, fan) for providing a continuous supply of hot fluid to the hot-side heat exchanger 18 over multiple heating/cooling cycles of the heat engine.

In an exemplary configuration (which is useful when ambient air is warmer than the deep ground temperature), the supply of cold 24 can be produced by a geothermal source of cold and the supply of hot 26 can be produced from ambient air. The geothermal source of cold can be a fluid, such as water or air, which is cooled as it passes through a conduit in thermal contact with the ground. It can also be ground water that is extracted from a well or a body of water (e.g., pond or lake).

In an alternate configuration (which is useful when the deep ground temperature is warmer than the ambient air), the supply of cold 24 can be produced from ambient air, while the supply of hot 26 can be produced by a geothermal source of hot. The geothermal source of hot can be a fluid, such as water or air, that is heated as it passes through a conduit in thermal contact with the ground. It can also be ground water that is extracted from a well or a body of water (e.g., pond or lake).

Figure 1B:
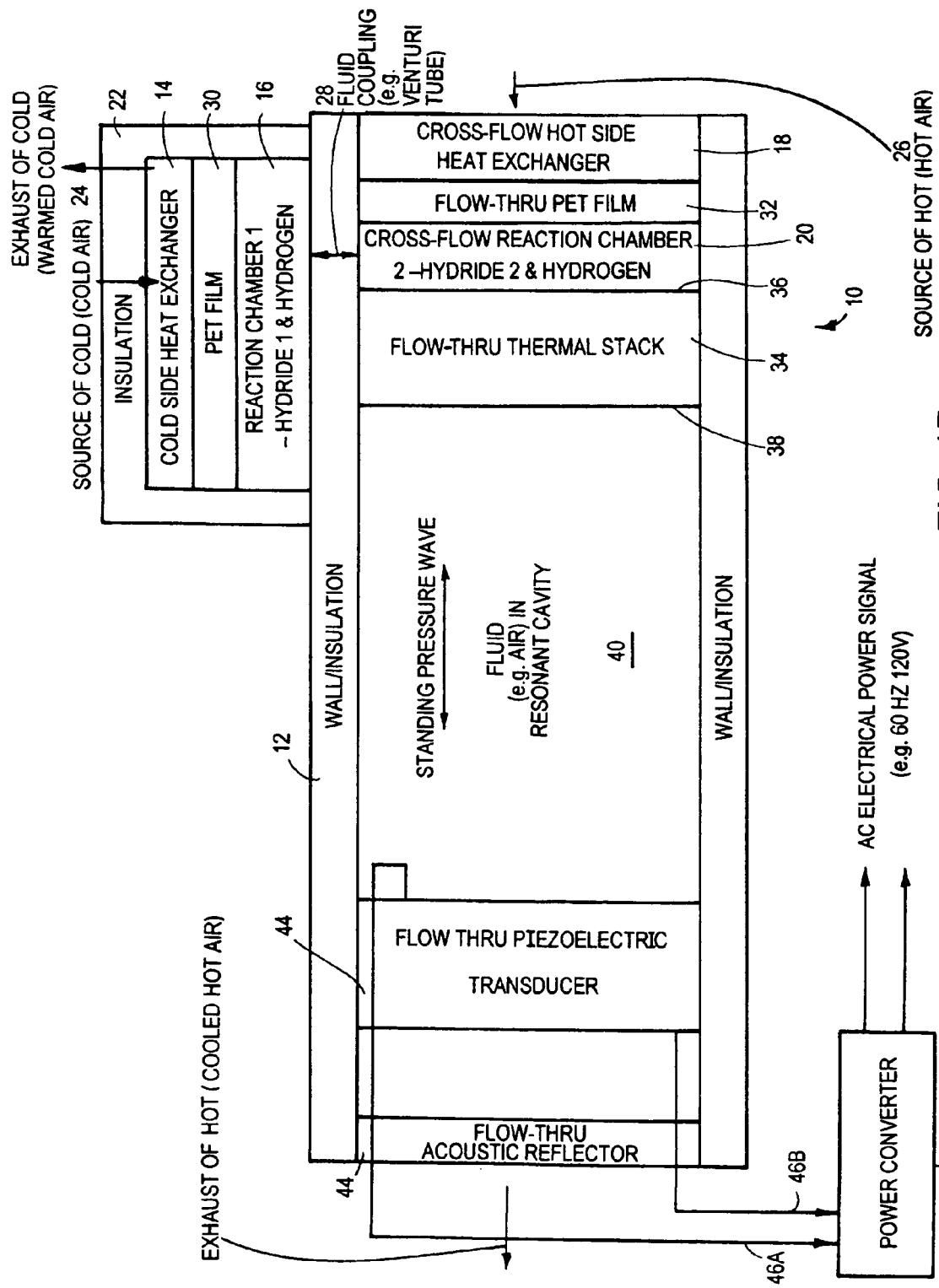
FIG. 1B is a block diagram of a power generator system in accordance with a second exemplary embodiment of the present invention.

It will be appreciated that the hot-side function of the heat exchanger 18 and associated reaction chamber 20 can be swapped with the cold-side function of the heat exchanger 14 and associated reaction chamber 20 as shown in FIG. 1B. In this manner, the system can switch between configurations depending upon the relative temperatures of the sources. Alternatively, valves and piping may be coupled to the sources of hot and cold and utilized to permit the system of FIG. 1A to switch between configurations depending upon the relative temperatures of the sources.

A fluid supply source and a pressure control mechanism (not shown) can be provided that cooperate to add working fluid (e.g., hydrogen) to the reaction chambers 16, 20 and adjust the pressure of the working fluid in such chambers as needed. When hydrogen is used as the working fluid, the fluid supply source can be realized by a vessel of hydrogen or possibly an apparatus for producing hydrogen by electrolysis of water. The pressure control mechanism can be realized by a pump and valves, which can possibly include a bleed valve for bleeding excess pressures to the ambient environment as needed.

The heat engine realized by the cold-side heat exchanger 14, first reaction chamber 16, hot-side heat exchanger 18 and second reaction chamber 20 generally operates as follows. In a continuous manner, the source of cold 24 continuously supplies cold fluid to the cold-side heat exchanger 16 and the source of hot 26 continuously supplies hot fluid to the hot-side heat exchanger 18. The temperature differential between the source of cold 24 and the source of hot 26 is utilized to generate work. More particularly, and as described in more detail hereinafter with reference to FIG. 2, this temperature differential is used to cause the temperature and pressure of the hydrogen working fluid, the metal hydride(s) and the phase change material(s) (if any) in the reaction chambers 16, 20 to cycle in order to induce temperature changes therein. The temperature changes of the reaction chamber 16 induce thermoacoustic oscillations of the thermal stack 34 that form a standing pressure wave within the resonant cavity 40. The standing pressure wave will have at a frequency at or near the operating frequency of the heat engine. The standing pressure wave induces cyclical mechanical stresses on the piezoelectric transducer 44. The electrodes 46A, 46B output a sequence of high voltage, low current electrical pulses (V+, V−) that are generated by the piezoelectric transducer 44 as a result of the cyclical mechanical stress induced therein by the standing pressure wave generated in the resonant cavity 40.

Figure 2:
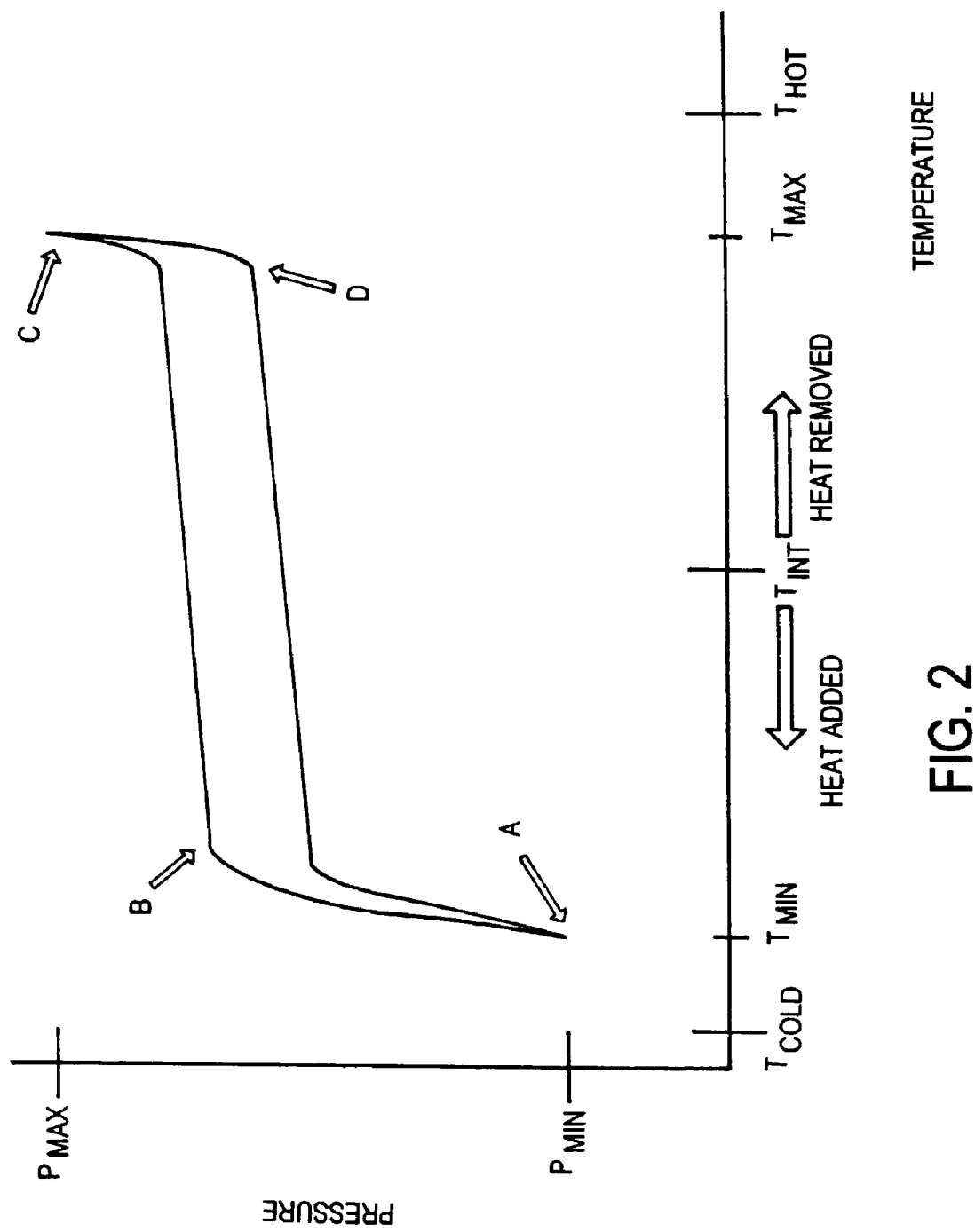
FIG. 2 is an exemplary Pressure-Temperature curve that illustrates the heating/cooling/pressure cycle of the reaction chambers of FIGS. 1A and 1B.

FIG. 2 illustrates an exemplary temperature-pressure cycle for each respective reaction chamber 16, 20 of the heat engine of FIGS. 1A and 1B, although it should be appreciated that the cycle seen is merely schematic and not to scale. The cycle includes 4 segments AB, BC, CD, DA. For purposes of explanation, it is assumed that the reaction chamber starts at a temperature and pressure near point A, which is preferably accomplished by controlling adjusting the pressure of the working fluid within the reaction chamber by operation of a pressure control mechanism. It is also assumed that the engine has a characteristic temperature $T_{INT}$ whereby:
  i) for temperature $T_{INT}$, heat flowing into the reaction chamber is substantially equal to the heat flowing out of the reaction chamber, which causes the temperature gradient within the reaction chamber to remain substantially constant;
  ii) for temperatures below $T_{INT}$, heat flowing into the reaction chamber exceeds heat flowing out of the reaction chamber which causes the temperature gradient within the reaction chamber to increase; and
  iii) for temperatures above $T_{INT}$, heat flowing out of the reaction exceeds the heat flowing into the reaction chamber, which causes the temperature gradient within the reaction chamber to decrease.

The characteristic temperature $T_{INT}$ is dictated by the temperature of the hot-side heat exchanger (labeled $T_{HOT}$) and the temperature of the cold-side heat exchanger (labeled $T_{COLD}$), the relative thermal conductivity of the hot-side and cold-side heat exchangers, and the relative size of the hot-side and cold-side heat exchangers.

During segment AB, heat flowing into the reaction chamber dominates heat flowing out of the reaction chamber, which causes the temperature gradient within the reaction chamber to increase. Such heat increases the temperature of the hydrogen working fluid, which causes a corresponding increase of the pressure within the reaction chamber as shown. The volume of the hydrogen working fluid remains substantially constant. The heat flow into the reaction chamber will cause the temperature and pressure within the reaction chamber to reach point B, which is the critical pressure/temperature point for absorption of hydrogen by the metal hydride material(s). Some time at or before this point, if a phase change material is present in the chamber, the material will absorb heat and change phase, thereby storing thermal energy. In any event, at the critical pressure/temperature point for the absorption of hydrogen by the metal hydride, segment BC begins.

During segment BC, the metal hydride material(s) within the reaction chamber absorbs the hydrogen working fluid. This absorption is an exothermic reaction, which releases heat and maintains the pressure of the hydrogen working fluid substantially constant at the critical pressure. During the absorption reaction, the pressure within the reaction chamber is maintained at a relatively constant pressure, which corresponds to the critical pressure of the metal hydride material(s). The absorption reaction continues until the metal hydride material(s) is(are) saturated. Upon saturation, the heat that was released earlier during the exothermic reaction can cause a spike or increase in the temperature of the reaction chamber and thus cause a corresponding increase/spike in pressure to a Point C as shown. At this point, segment CD begins.

During segment CD, heat flowing out of the reaction chamber dominates the heat flowing into the reaction chamber, which causes the temperature gradient within the reaction chamber to decrease. This causes the temperature of the hydrogen working fluid and a corresponding decrease of the pressure within the reaction chamber as shown. When the temperature and pressure of the reaction chamber drop below a critical temperature and pressure for hydrogen desorption (point D), segment DA begins.

When the temperature and pressure within the reaction chamber drop below the critical temperature and pressure point D, the metal hydride material(s) desorbs hydrogen by an endothermic reaction that absorbs heat, thereby accelerating the decrease in temperature of the reaction chamber and the cooling mode cycle time. In addition, where phase change material is present, the phase change material releases its thermal energy and reverts to its original phase. The segment DA continues until point A where the reaction chamber can support an increase in the temperature of the hydrogen working fluid. At that point the cycle restarts.

In the configurations of FIGS. 1A and 1B, the initial pressure of the first reaction chamber 16 can be initialized to begin operation at or near point C, while the initial pressure of the second reaction chamber 20 can be initialized to begin operation at or near point A. The two reaction chambers 16, 20 cycle through their heating and cooling cycles as follows:

| Reaction Chamber 16 | Reaction Chamber 20 |
|---|---|
| Segment CD | Segment AB |
| Segment DA | Segment BC |
| Segment AB | Segment CD |
| Segment BC | Segment DA |

In this configuration, the metal hydride material(s) of the first reaction chamber 16 is(are) absorbing hydrogen (releasing heat) during segment BC while the metal hydride material(s) of the second reaction chamber 18 is(are) desorbing hydrogen (absorbing heat) during segment DA, and vice-versa, over the expected temperature differentials between the cold-side heat exchanger 14 and the hot-side heat exchanger 18. When the first reaction chamber releases heat, it flows via the working fluid through the fluid coupling 28 to the second reaction chamber 20 where it is absorbed. Similarly, when the second reaction chamber 20 release heat, it flows via the working fluid through the fluid coupling 28 to the first reaction chamber 16 where it is absorbed. In this manner, the heat generation and heat absorption operations of the reaction chambers 16 and 20 are at (or near) 180 degrees out of phase with respect to one another in order to minimize the cycle time (maximize the frequency) of the chemical heat engine.

The temperature levels of the reaction chamber 16 in thermal contact with the thermal stack 34 cycle between $T_{MIN}$ and $T_{MAX}$ during the heat engine cycle as shown. Such temperature changes induce thermoacoustic oscillations of the thermal stack 34 that form a standing pressure wave within the resonant cavity 40. The standing pressure wave will have a frequency at or near the operating frequency of the heat engine. The standing pressure wave induces cyclical mechanical stresses on the piezoelectric transducer 44. The electrodes 46A, 46B output a sequence of high voltage, low current electrical pulses (V+, V−) that are generated by the piezoelectric transducer 44 as a result of the cyclical mechanical stress induced therein by the standing pressure wave generated in the resonant cavity 40.

As previously mentioned, one or more phase change materials may be used as part of the reaction chambers 16, 20 as described above. The phase change material(s) are disposed in thermal contact with the hydrogen working fluid. The phase change material(s) is(are) tuned to absorb heat at or near the temperature of Point B for absorption of hydrogen working fluid by the metal hydride material(s), and release heat during the desorption of hydrogen working fluid by the metal hydride material(s) during segment DA. This aids in reducing the cycle time of the chemical heat engine and the power generated by the chemical heat engine.

The preferred embodiment of the system 10 includes a power converter 50 that converts the electrical signals output by the piezoelectric transducer 44 over the electrode pair(s) 46A, 46B into a desired electrical output form. The electrical output produced by the power converter 50 can be adapted for a wide range of power supply applications, such as residential or commercial power supply applications. It can be an AC power supply signal or a DC power supply signal. In the preferred embodiment, the electrical output produced by the power converter 36 is a standard AC power supply signal typically supplied by mains power (e.g., a 60 Hz 120V AC electrical supply signal). In the preferred embodiment, the power converter 50 is realized by an assembly that includes an electrostatic motor and an electromechanical battery as described in detail in U.S. patent application Ser. No. 11/530,147, entitled "SYSTEM AND METHODOLOGY FOR GENERATING ELECTRICITY USING A CHEMICAL HEAT ENGINE AND PIEZOELECTRIC MATERIAL," which is incorporated by reference above in its entirety.

Figure 3:
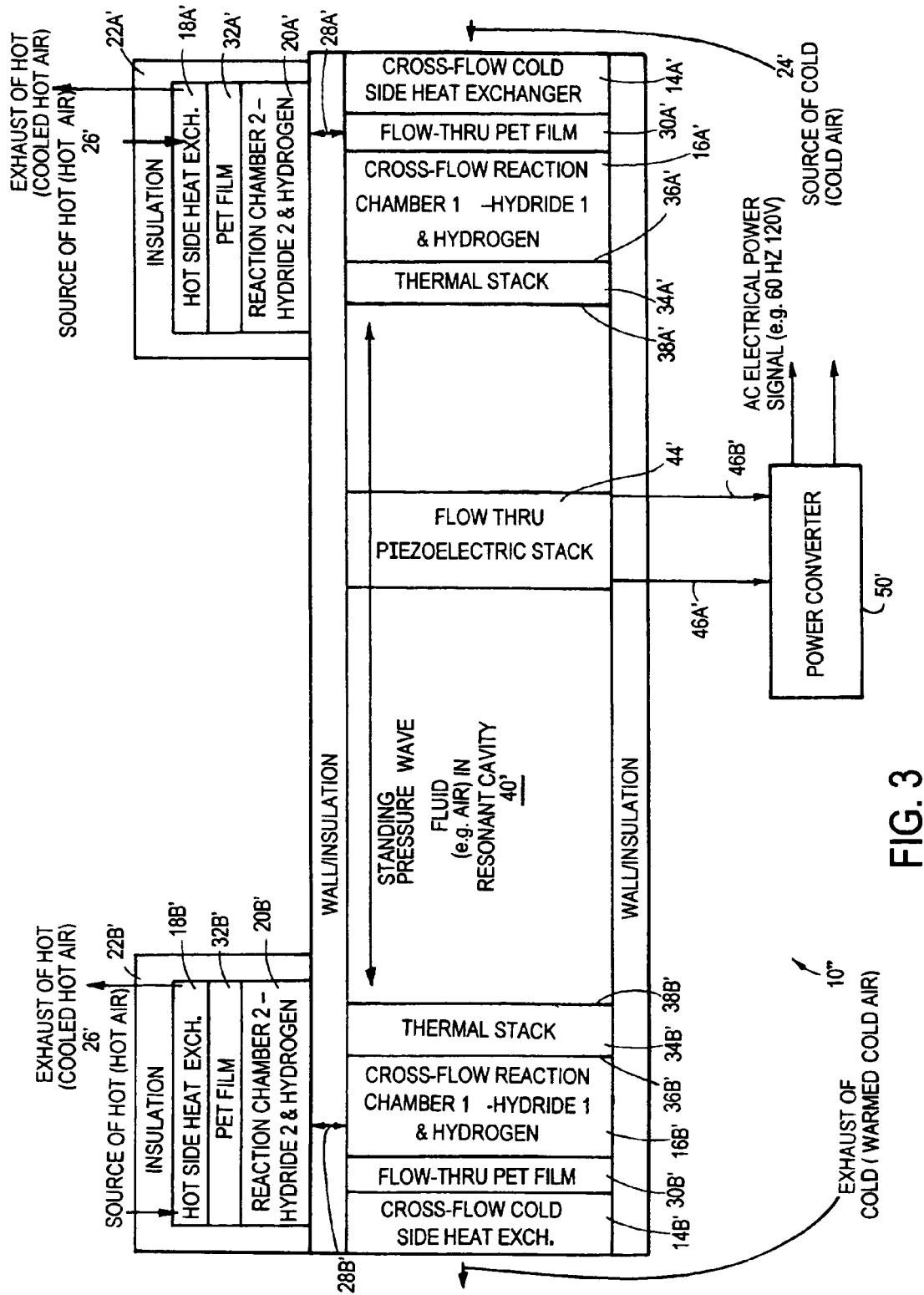
FIG. 3 is a block diagram of a power generation apparatus in accordance with a third embodiment of the present invention.

An alternate embodiment of an energy generator system 10' in accordance with the present invention is shown in FIG. 3. The system 10' includes a tubular housing 12' preferably with an exterior thermal insulating liner, which can be realized with a space filled with an aerogel or other suitable thermal insulating material. The housing 12' defines an interior space, part of which forms a resonant cavity 40'. A cold-side heat exchanger 14A' in thermal contact with a reaction chamber 16A' is supported in the interior space of the housing 12' on one side of the resonant cavity 40' as shown. A hot-side heat exchanger 18A' in thermal contact with a reaction chamber 20A' is supported on the exterior of the housing 12'. An exterior thermal insulating liner 22A', which can be realized with a space filled with an aerogel or other suitable thermal insulating material, preferably surrounds the hot-side heat exchanger 18A' and second reaction chamber 20A' in order to insulate these components. A cold-side heat exchanger 14B' in thermal contact with a reaction chamber 16B' is supported in the interior space of the housing 12' on the other side of the resonant cavity 40' as shown. A hot-side heat exchanger 18B' in thermal contact with a reaction chamber 20B' is supported on the exterior of the housing 12'. An exterior thermal insulating liner 22B', which can be realized with a space filled with an aerogel or other suitable thermal insulating material, preferably surrounds the hot-side heat exchanger 18B' and second reaction chamber 20B' in order to insulate these components.

A supply of cold 24' (e.g., cold air) is supplied to the cold-side heat exchangers 14A' and 14B'. A supply of hot 26' (e.g., hot air) is supplied to the hot-side heat exchangers 18A' and 18B'. The reaction chambers 16A' and 20A' are fluidly coupled to one another by a fluid coupling mechanism 28A' such as a venturi tube or the like. The reaction chambers 16B' and 20B' are fluidly coupled to one another by a fluid coupling mechanism 28B' such as a venturi tube or the like. The reaction chambers 16A' and 20A' include metal hydride material and preferably phase change material that operate in conjunction with hydrogen working fluid therein as a chemical heat engine that is powered by the temperature difference between the cold-side heat exchanger 14A' (dictated by the source of cold 24') and the hot-side heat exchanger 18A' (dictated by the source of hot 26'). Similarly, the reaction chambers 16B' and 20B' include metal hydride material and preferably phase change material that operate in conjunction with hydrogen working fluid therein as a chemical heat engine that is powered by the temperature difference between the cold-side heat exchanger 14B' (dictated by the source of cold 24') and the hot-side heat exchanger 18B' (dictated by the source of hot 26').

The reaction chamber 16A' contains at least one metal hydride material capable of hydrogen absorption and desorption and preferably at least one phase change material in thermal contact with the hydrogen working fluid. The reaction chamber 20A' contains at least one metal hydride material capable of hydrogen absorption and desorption and preferably at least one phase change material in thermal contact with the hydrogen working fluid. The metal hydride material(s) of the reaction chambers 16A', 20A' are selected such that the metal hydride material(s) of the reaction chamber 16A' is(are) absorbing hydrogen (releasing heat) while the metal hydride material(s) of the reaction chamber 20A' is(are) desorbing hydrogen (absorbing heat), and vice-versa, over the expected temperature differentials between the cold-side heat exchanger 14A' and the hot-side heat exchanger 18A'. In this manner, the heat generation and heat absorption operations of the reaction chambers 16A' and 20A' are at (or near) 180 degrees out of phase with respect to one another in order to minimize the cycle time (maximize the frequency) of the chemical heat engine.

Similarly, the reaction chamber 16B' contains at least one metal hydride material capable of hydrogen absorption and desorption and preferably at least one phase change material in thermal contact with the hydrogen working fluid. The reaction chamber 20B' contains at least one metal hydride material capable of hydrogen absorption and desorption and preferably at least one phase change material in thermal contact with the hydrogen working fluid. The metal hydride material(s) of the reaction chambers 16B', 20B' are selected such that the metal hydride material(s) of the reaction chamber 16B' is(are) absorbing hydrogen (releasing heat) while the metal hydride material(s) of the reaction chamber 20B' is(are) desorbing hydrogen (absorbing heat), and vice-versa, over the expected temperature differentials between the cold-side heat exchanger 14B' and the hot-side heat exchanger 18B'. In this manner, the heat generation and heat absorption operations of the reaction chambers 16B' and 20B' are (at or near) 180 degrees out of phase with respect to one another in order to minimize the cycle time (maximize the frequency) of the chemical heat engine.

During the cyclical operations of the heat engine realized by reaction chambers 16A' and 20A', heat flows from the hot-side heat exchanger 18A' to the reaction chamber 20A' and heat flows from the reaction chamber 16A' to the cold-side heat exchanger 14A'. A film 30A' of metallized biaxially-oriented polyethylene terephthalate (PET) or the like can be disposed between the cold-side heat exchanger 14A' and the reaction chamber 16A' to minimize unwanted heat flow from the cold-side heat exchanger 14A' to the reaction chamber 16A'. Similarly, a film 32A' of metallized biaxially-oriented polyethylene terephthalate (PET) or the like can be disposed between the hot-side heat exchanger 18A' and the reaction chamber 20A' to minimize unwanted heat flow from the reaction chamber 20A' to the hot-side heat exchanger 18A'.

During the cyclical operations of the heat engine realized by reaction chambers 16B' and 20B', heat flows from the hot-side heat exchanger 18B' to the reaction chamber 20B' and heat flows from the reaction chamber 16B' to the cold-side heat exchanger 14B'. A film 30B' of polyethylene terephthalate (PET) or the like can be disposed between the cold-side heat exchanger 14B' and the reaction chamber 16B' to minimize unwanted heat flow from the cold-side heat exchanger 14B' to the reaction chamber 16B'. Similarly, a film 32B' of polyethylene terephthalate (PET) or the like can be disposed between the hot-side heat exchanger 18B' and the reaction chamber 20B' to minimize unwanted heat flow from the reaction chamber 20B' to the hot-side heat exchanger 18B'.

Two thermal stacks 34A', 34B' are disposed in the interior space of the housing 12' on opposite sides of the resonant cavity 40'. The thermal stacks 34A', 34B' are each preferably realized by a series of thin parallel fins or an interconnected grid of thin rod-like members made of a thermally conductive material such as copper, cooper alloys, stainless steel, pyrolytic graphite. The thermal stacks 34A', 34B' can also be realized from a honeycomb-like thin walled ceramic structure, such as Celcore® sold commerically by Corning Environmental Technologies of Corning, N.Y.

The thermal stack 34A' has one side 36A' opposite side 38A'. The side 36A' is in thermal contact with the reaction chamber 16A'. The cyclical temperature variation of the reaction chamber 16A' during the heating and cooling cycles of the heat engine realized by the reaction chambers 16A' and 20A' are experienced at the side 36A' of the thermal stack 34A'. Such cyclical temperature variations cause thermoacoustic oscillations of the thermal stack 34A'.

The thermal stack 34B' has one side 36B' opposite side 38B'. The side 36B' is in thermal contact with the reaction chamber 16B'. The cyclical temperature variation of the reaction chamber 16B' during the heating and cooling cycles of the heat engine realized by the reaction chambers 16B' and 20B' are experienced at the side 36B' of the thermal stack 34B'. Such cyclical temperature variations cause thermoacoustic oscillations of the thermal stack 34B'.

The resonant cavity 40' extends between the side 38A' of thermal stack 40A' and the side 38B' of thermal stack 40B'. The thermal stacks 34A', 34B' and resonant cavity 40' are designed such that the thermoacoustic oscillations of the thermal stacks 34A', 34B' cooperate to form a standing pressure wave within the resonant cavity 40'. The standing pressure wave will have a frequency at or near the operating frequency of the heat engines. In the preferred embodiment, the effective length of the resonant cavity 40' is proportional to ½ the wavelength of the standing pressure wave. The housing 12' can be adapted such that is interior surface of the resonant cavity 40' is acoustically reflective and thus minimizes any acoustic losses therein.

A piezoelectric transducer 44' is disposed within the resonant cavity 40'. The piezoelectric transducer 44' is realized from a piezoelectric material such as quartz, Rochelle salt, barium titanate, zinc oxide, lead titanate, lead zirconate titanate, lead lanthanum zirconate titanate, lead magnesium niobate, potassium niobate, potassium sodium niobate, potassium tantalate niobate, lead niobate, lithium niobate, lithium tantalate, fluoride poly(vinylidene flouride or other suitable material. In the preferred embodiment, the piezoelectric transducer 44' is realized as an interconnected grid of thin rod-like piezoelectric members. The standing pressure wave that is generated in the resonant cavity 40' induces cyclical mechanical stresses on the piezoelectric transducer 44'. At least one pair of electrodes 46A', 46B' are electrically coupled to the piezoelectric transducer 44'. The electrodes 46A', 46B' output electrical signals generated by the piezoelectric transducer 44' as a result of the cyclical mechanical stress induced therein by the standing pressure wave generated in the resonant cavity 40'.

In the illustrative embodiment shown, the source of cold 24' (e.g., cold air) is injected or drawn into one end of the tubular housing 12' and flows through the interior space of the tubular housing 12' where it warmed by the operation of the heat engines and ejected or pulled from the opposite end of the tubular housing 12'. In this configuration, the components of the system disposed within the interior space of the housing 12' (cold-side heat exchanger 14A', film 30A', reaction chamber 16A', thermal stack 34A', piezoelectric transducer 44', thermal stack 34B', reaction chamber 16B', film 30B', cold side heat exchanger 14B') allow for flow-thru of such cold fluid.

In alternate embodiments not shown, the source of cold 24' can be supplied to the cold-side heat exchangers 14A', 14B' by a fluid coupler or the like. When such a fluid coupler is used, the components of the system disposed within the interior space of the housing 12' (cold-side heat exchanger 14A', film 30A', reaction chamber 16A', thermal stack 34A', piezoelectric transducer 44', thermal stack 34B', reaction chamber 16B', film 30B', cold side heat exchanger 14B') need not allow for flow-thru of such cold fluid.

The metal hydride material(s) of the reaction chambers 16A', 20A', 16B', 20B' can be held in one or more beds or other storage container(s). Such metal hydride material(s) may comprise:
  i) lithium nitride;
  ii) magnesium hydride;
  iii) lanthium nickel hydride (LaNi5H6), or modifications of lanthium nickel hydride by some substitution of either the La or Ni;
  iv) vanadium-based solid solution which have the general formula (V1-xTix)1-y My, where M is usually a Group VI to VIII metal such as Fe, Ni, Cr, or Mn; and/or
  v) Laves phase hydrides which have the general formula, AB2, where A is usually a rare earth, Group III or Group IV metal and B is usually a Group VIII metal, but may also be a metal from Groups V, VI or VII.

The phase change material(s) of the reaction chambers 16A', 20A', 16B', 20B' can be zeolite, eutectic alloys, paraffins, organic compounds, salt hydrates, carbonates, nitrates, polyhydric alcohols and metals.

As described above, a supply of cold 24' is supplied to the cold-side heat exchangers 16A' and 16B'. A supply of hot 26' is supplied to the hot-side heat exchangers 18A' and 18B'. The supply of cold 24' preferably includes a circulator (e.g., pump, fan) for providing a continuous supply of cold fluid to the cold-side heat exchangers 16A', 16B' over multiple heating/cooling cycles of the chemical heat engines. The supply of hot 26' preferably includes a circulator (e.g., pump, fan) for providing a continuous supply of hot fluid to the hot-side heat exchangers 18A', 18B' over multiple heating/cooling cycles of the heat engine.

In an exemplary configuration (which is useful when ambient air is warmer than the deep ground temperature), the supply of cold 24' can be produced by a geothermal source of cold and the supply of hot 26' can be produced from ambient air. The geothermal source of cold can be a fluid, such as water or air, which is cooled as it passes through a conduit in thermal contact with the ground. It can also be ground water that is extracted from a well or a body of water (e.g., pond or lake).

In an alternate configuration (which is useful when the deep ground temperature is warmer than the ambient air), the supply of cold 24' can be produced from ambient air, while the supply of hot 26' can be produced by a geothermal source of hot. The geothermal source of hot can be a fluid, such as water or air, that is heated as it passes through a conduit in thermal contact with the ground. It can also be ground water that is extracted from a well or a body of water (e.g., pond or lake).

It will be appreciated that the hot-side function of the heat exchanger 18A' and associated reaction chamber 20A' can be swapped with the cold-side function of the heat exchanger 14A' and associated reaction chamber 20A' similar to that shown in FIG. 1B. The hot-side function of the heat exchanger 18B' and associated reaction chamber 20B' can be swapped with the cold-side function of the heat exchanger 14B' and associated reaction chamber 20B' similar to that shown in FIG. 1B. In this manner, the system can switch between configurations depending upon the relative temperatures of the sources. Alternatively, valves and piping may be coupled to the sources of hot and cold and utilized to permit the system of FIG. 3 to switch between configurations depending upon the relative temperatures of the sources.

A fluid supply source and a pressure control mechanism (not shown) can be provided to add working fluid (e.g., hydrogen) to the reaction chambers 16A', 20A', 16B', 20B', and adjust the pressure of the working fluid in such chambers as needed. When hydrogen is used as the working fluid, the fluid supply source can be realized by a vessel of hydrogen or possibly an apparatus for producing hydrogen by electrolysis of water. The pressure control mechanism can be realized by a pump and valves, which can possibly include a bleed valve for bleeding excess pressures to the ambient environment as needed.

The heat engine realized by the cold-side heat exchanger 14A', reaction chamber 16A', hot-side heat exchanger 18A' and reaction chamber 20A' operates in a similar manner to the heat engine described above with respect to FIGS. 1A, 1B and 2. The heat engine realized by the cold-side heat exchanger 14B', reaction chamber 16B', hot-side heat exchanger 18B' and reaction chamber 20B' also operates in a similar manner to the heat engine described above with respect to FIGS. 1A, 1B and 2. In a continuous manner, the source of cold 24' continuously supplies cold fluid to the cold-side heat exchangers 16A' and 16B' and the source of hot 26' continuously supplies hot fluid to the hot-side heat exchangers 18A' and 18B'. The temperature differential between the source of cold 24' and the source of hot 26' is utilized to generate work. More particularly, and as described above in detail with reference to FIG. 2, this temperature differential is used to cause the temperature and pressure of the hydrogen working fluid, the metal hydride(s) and the phase change material(s) (if any) in the reaction chambers 16A', 18A' to cycle in order to induce temperature changes therein. The temperature changes of the reaction chamber 16A' induce thermoacoustic oscillations of the thermal stack 34A'. The temperature differential between the source of cold 24' and the source of hot 26' also causes the temperature and pressure of the hydrogen working fluid, the metal hydride(s) and the phase change material(s) (if any) in the reaction chambers 16B', 18B' to cycle in order to induce temperature changes therein. The temperature changes of the reaction chamber 16B' induce thermoacoustic oscillations of the thermal stack 34B'. The thermal stacks 34A', 34B' cooperate to form a standing pressure wave within the resonant cavity 40'. The standing pressure wave will have at a frequency at or near the operating frequency of the two heat engines. The standing pressure wave induces cyclical mechanical stresses on the piezoelectric transducer 44'. The electrodes 46A', 46B' output a sequence of high voltage, low current electrical pulses (V+, V−) that are generated by the piezoelectric transducer 44' as a result of the cyclical mechanical stress induced therein by the standing pressure wave generated in the resonant cavity 40'.

Advantageously, the energy conversion systems and methodologies of the present invention can readily be adapted to undergo large and/or high frequency temperature variations which induce the generation of large and/or high frequency pressure waves by the thermoacoustical element. Such large/high frequency pressure waves and produce large/high frequency stresses and corresponding large/high frequency deformations of the piezoelectric transducer. Such deformations cause high voltage, low current pulses that are transformed by the power converter to generate electrical power suitable for a wide range of power supply applications, such as residential or commercial power supply applications. Moreover, the energy conversion systems and methodologies of the present invention can readily be adapted to utilize environmentally friendly, low-cost geothermal and ambient sources of hot and cold for powering the system.

Figure 4:
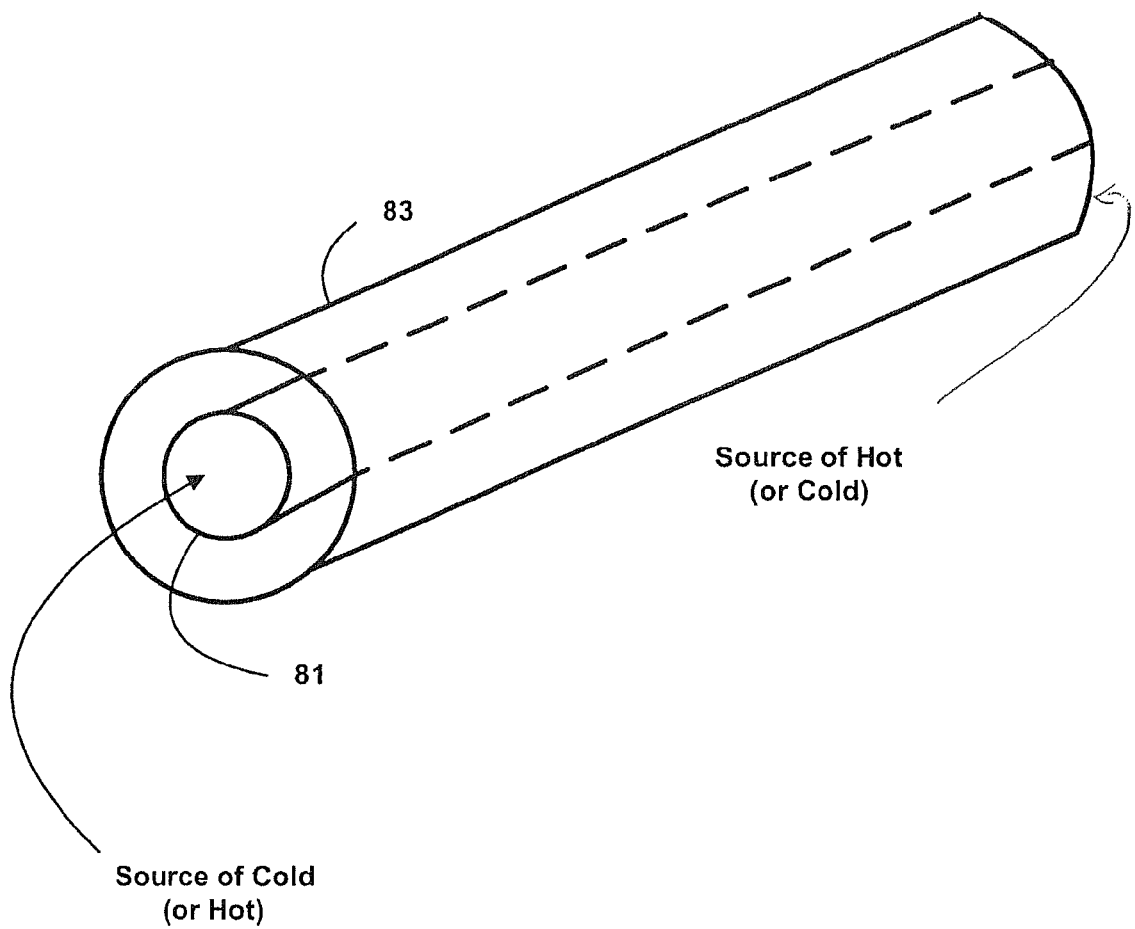
FIG. 4 is a schematic diagram of a tube-in-tube configuration for a power generation system in accordance with the present invention.

There have been described and illustrated herein several embodiments of a system and methodology for generating electricity using a heat engine that drives a thermoacoustic source to generate a pressure wave that deforms piezoelectric material(s). The electrical energy is harvested from the piezoelectric material(s) and converted into useable form. While particular embodiments of the invention have been described, it is not intended that the invention be limited thereto, as it is intended that the invention be as broad in scope as the art will allow and that the specification be read likewise. Thus, while particular system configurations have been disclosed, it will be appreciated that other system configurations can be used as well. For example, it is contemplated that a hot-side heat exchanger and a cold-side heat exchanger can be disposed adjacent opposite sides of the thermal stack in order to induce thermoacoustic oscillations of the thermal stack. In another example, multiple thermal stacks and associated heat exchange elements can be disposed in series to generate a traveling pressure wave. One or more piezoelectric transducer elements can be disposed along the path of the traveling pressure wave in order to generate electric signals therefrom. In yet another configuration as shown in FIG. 4, it is contemplated that the chemical heat engines and thermoacoustic stacks as described herein can be arranged in a tube-in-tube type configuration. In this configuration, an inner tube 81 carries the source of hot (or cold) as well as one or more reaction chambers, heat exchangers, thermal stack(s)/piezoelectric transducers. The outer tube 83 carries the source of cold (or hot) as well as one or more reaction chambers, heat exchangers, thermal stack(s)/piezoelectric transducers. The reaction chamber(s) of the inner tube 81 are fluidly coupled to the reaction chambers of the outer tube 83. The temperature cycles generated by the chemical heat engine realized by the fluidly-coupled reaction chambers induce thermoacoustic oscillations in the thermal stacks of the respective tubes, which in turn induce deformation of the piezoelectric transducers of the respective tubes and the generation of electrical supply signals therefrom. Also, while particular sources of hot and cold have been described, it is contemplated that the heat engine can be powered by other sources of hot and cold. For example, seawater and ambient air can be used as sources of cold and hot or vice versa, depending on the season. Moreover, while particular materials and designs have been disclosed in reference to the heat engine and piezoelectric transducer elements, it will be appreciated that other configurations could be used as well. For example, it is contemplated that the piezoelectric transducer and thermal stack can be integrally formed as a unitary part, for example, by integrating piezoelectric material into a ceramic thermoacoustic structure. It is also contemplated that the acoustic energy generated by the thermal stack(s) can be transformed or otherwise modified before impinging on the piezoelectric transducer element(s) of the system. For example, the frequency of such acoustic energy can be increased while the amplitude of such acoustic energy is decreased before impinging on the piezoelectric transducer element(s) of the system. It will therefore be appreciated by those skilled in the art that yet other modifications could be made to the provided invention without deviating from its spirit and scope as claimed.

What is claimed is:

1. A system for generating electrical signals, comprising:
at least one chemical heat engine that undergoes cycles of heating and cooling and corresponding temperature variations, the chemical heat engine including a heat exchanger thermally coupled to a reaction chamber, the reaction chamber containing at least one metal hydride material and hydrogen, the hydride material capable of hydrogen absorption and desorption in the reaction chamber during the cycles of heating and cooling;
at least one thermoacoustic element thermally coupled to the reaction chamber which undergoes thermoacoustic oscillations in response to temperature variations of the reaction chamber to thereby emit acoustic energy therefrom; and at least one piezoelectric transducer operably coupled to the thermoacoustic element which is deformed in response to pressure variations of the acoustic energy emitted from the thermoacoustic element and generates an electrical output signal as a result of the deformation.

2. A system according to claim 1, further comprising:
a housing defining an internal cavity, wherein the at least one thermoacoustic element and the at least one piezoelectric transducer are disposed within the internal cavity of the housing.

3. A system according to claim 1, further comprising:
a power converter operably coupled to the at least one piezoelectric transducer which transforms said electrical output signal to a desired electrical power supply signal.

4. A system according to claim 1, wherein:
the chemical heat engine has a geothermal source of cold and an ambient source of hot.

5. A system according to claim 1, wherein:
the chemical heat engine has a geothermal source of hot and an ambient source of cold.

6. A system according to claim 1, wherein:
the chemical heat engine utilizes at least one phase change material.

7. A system according to claim 6, wherein:
the metal hydride material absorbs hydrogen at a first pressure and a first temperature, and the first temperature corresponds to a temperature at which the phase change material releases heat.

8. A system according to claim 7, wherein:
the metal hydride material desorbs hydrogen at a second pressure and a second temperature, the second temperature corresponding to a temperature at which the phase change material absorbs heat.

9. A system according to claim 1, further comprising:
a housing defining a resonant cavity, wherein the at least one thermoacoustic element and the at least one piezoelectric transducer are disposed within the resonant cavity, and the at least one thermoacoustic element is adapted to generate a standing pressure wave within the resonant cavity.

10. A system according to claim 1, further comprising:
a housing defining a resonant cavity;
wherein the at least one piezoelectric transducer is disposed within the resonant cavity, the at least one thermoacoustic element comprises first and second thermoacoustic elements that are disposed within the resonant cavity on opposite sides of the resonant cavity, the first thermoacoustic element being thermally coupled to a reaction chamber of a first chemical heat engine, the second thermoacoustic element being thermally coupled to a reaction chamber of a second chemical heat engine, and the first and second thermoacoustic elements adapted to generate a standing pressure wave within the resonant cavity.

11. A system according to claim 1, wherein:
the chemical heat engine has at least a first part and a second part, the first part including a first reaction chamber and a first heat exchanger in thermal contact with the at least one thermoacoustic element, and the second part including a second reaction chamber and second heat exchanger, wherein the second reaction chamber is in fluid communication with the first reaction chamber.

12. A system according to claim 11, wherein:
the thermoacoustic element and the first part of the heat engine are disposed within a housing, and the second part of the heat engine is disposed outside the housing.

13. A system according to claim 12, wherein:
the housing provides a flow path for cold or hot fluid.

14. A system according to claim 13, wherein:
the thermoacoustic element and the first part of the heat engine provide for flow-through of the hot or cold fluid.

15. A system according to claim 12, wherein:
the housing is tubular in shape.

16. A system according to claim 11, further comprising:
means for fluidly coupling the first and second reaction chambers of the chemical heat engine.

17. A system according to claim 11, wherein:
the first part of the chemical heat engine generates heat when the second part of the chemical heat engine absorbs heat, and the first part of the chemical heat engine absorbs heat when the second part of the chemical heat engine generates heat.

18. A system according to claim 1, further comprising:
a first tube disposed within a second tube, the first and second tubes housing corresponding parts of at least one chemical heat engine.

19. A system according to claim 18, wherein:
the first tube houses at least one piezoelectric transducer and at least one thermoacoustic element in thermal contact with corresponding parts of said at least one chemical heat engine; and
the second tube houses at least one piezoelectric transducer and at least one thermoacoustic element in thermal contact with corresponding parts of said at least one chemical heat engine.

20. A system according to claim 1, wherein:
said at least one chemical heat engine includes a geothermal energy source.

21. A system according to claim 1, wherein:
the reaction chamber is disposed adjacent said thermoacoustic element and in thermal contact therewith.

22. A system according to claim 1, further comprising:
a film of metallized biaxially-oriented polyethylene terephthalate (PET) disposed between the heat exchanger and the reaction chamber of the chemical heat engine for minimizing bidirectional heat transfer therebetween.

* * * * *